US009877205B2

(12) United States Patent
Li et al.

(10) Patent No.: US 9,877,205 B2
(45) Date of Patent: Jan. 23, 2018

(54) WIRELESS NETWORK DEPLOYMENT METHOD, APPARATUS AND SYSTEM

(71) Applicant: FUJITSU LIMITED, Kawasaki (JP)

(72) Inventors: Hongchun Li, Beijing (CN); Jun Tian, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/919,160

(22) Filed: Oct. 21, 2015

(65) Prior Publication Data

US 2016/0127916 A1    May 5, 2016

(30) Foreign Application Priority Data

Oct. 31, 2014  (CN) .......................... 2014 1 0602422

(51) Int. Cl.
*H04W 40/00*  (2009.01)
*H04W 24/00*  (2009.01)
*H04W 4/00*   (2009.01)
*H04W 16/18*  (2009.01)

(52) U.S. Cl.
CPC .................................. *H04W 16/18* (2013.01)

(58) Field of Classification Search
CPC ..................................................... H04W 16/18
USPC ......................................................... 455/446
See application file for complete search history.

(56) References Cited

U.S. PATENT DOCUMENTS

| 7,496,361 | B1* | 2/2009 | Mitchell | ................. | H04L 67/12 |
| | | | | | 455/423 |
| 2003/0003918 | A1* | 1/2003 | Proctor | ................. | H04W 16/14 |
| | | | | | 455/446 |
| 2005/0059405 | A1* | 3/2005 | Thomson | .............. | H04W 16/18 |
| | | | | | 455/446 |
| 2005/0059406 | A1* | 3/2005 | Thomson | .............. | H04W 16/00 |
| | | | | | 455/446 |
| 2010/0278144 | A1* | 11/2010 | Olofsson | ............... | H04W 36/10 |
| | | | | | 370/331 |
| 2013/0183998 | A1* | 7/2013 | Pylappan | ................ | H04W 4/02 |
| | | | | | 455/456.1 |

FOREIGN PATENT DOCUMENTS

| CN | 200710068576.1 | 5/2007 |
| CN | 201210404144.4 | 10/2012 |

* cited by examiner

*Primary Examiner* — Rafael Pérez-Gutiérrez
*Assistant Examiner* — Mark G. Pannell
(74) *Attorney, Agent, or Firm* — Staas & Halsey LLP

(57) ABSTRACT

A wireless network deployment method, apparatus and system where the includes: initializing the wireless network to determine a deployment area and the number of access points needing to be deployed; initializing positions of the access points, and dividing the deployment area into grids; calculating a virtual force of each access point based on signal coverage of each grid; calculating a movement position of each point according to the virtual force; performing edge controlling on each point; and terminating processing when a terminating condition is satisfied. A deployment process is simulated as a dynamic physical process, movement of the access points along a direction of a resultant force of all repulsion forces and attractive forces is controlled following the principle that an overlapping covered area produces a repulsion force and an uncovered area produces an attractive force.

17 Claims, 13 Drawing Sheets

WIRELESS NETWORK DEPLOYMENT METHOD, APPARATUS AND SYSTEM

CROSS-REFERENCE TO RELATED APPLICATIONS

This application claims the benefit of Chinese Application No. 201410602422.6, filed Oct. 31, 2014, the disclosure of which is incorporated herein by reference.

BACKGROUND

1. Field

The present disclosure relates to the field of communication technologies, and in particular to a wireless network deployment method, apparatus and system.

2. Description of the Related Art

Currently, various mobile equipment emerges endlessly, such as a notebook computer, a tablet computer, a smart mobile phone, a wearable device, and a smart sensor, etc. The market of mobile equipment is also booming, and many users have multiple different or identical types of mobile equipment. Wireless communication is one of the core functions of the mobile equipment. There are a variety of wireless communication networks, such as a cellular network, a WiFi network, and a Bluetooth network, etc., which are supported by much mobile equipment. In the above common wireless networks, network equipment may be divided into infrastructure and terminal equipment. In a cellular network, a base station of an operator is an infrastructure, and a mobile phone of a user is terminal equipment; in a WiFi network, an access point providing network connection is an infrastructure, and wireless equipment connected to the network via the access point is terminal equipment; and a Bluetooth network is also of a star structure, and its master equipment may be deemed as an infrastructure, and its slave equipment may be deemed as terminal equipment. How to provide high-quality wireless communication services to mobile equipment is a crucial problem.

Deployment of a wireless network refers to determining positions of infrastructures in the wireless network, so as to ensure good signal coverage, and make terminal equipment of a user to obtain high-quality network services at any position in the covered area. Manual deployment or automatic deployment may be used in deploying a wireless network. In the manual deployment method, experiences of coverage and signal propagation feature of infrastructure of engineering personnel may be used to determine position of the infrastructure. Taking a WiFi network as an example, as its coverage is small, the manual deployment method can be used to build a home indoor wireless network, simple and convenient, but the manual deployment method is hard to satisfy the requirements of deploying the WiFi network in a range of a larger area, such as a campus, a shopping mall, or an airport. Deployment of a wireless network may also be completed automatically by using certain method and apparatus. A common network deployment method is to deem a problem of deployment of a wireless network as a problem of optimization, which is solved by using a legacy algorithm, or a heuristic search method, etc. However, the problem of deployment of a wireless network is a nonlinear problem of optimization, many parameters may be influenced and the search space is very large. Using a legacy algorithm or a heuristic search method to solve this problem needs a large amount of calculation resources and is time-consuming.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

In order to solve the problems proposed in the Background, embodiments of the present disclosure provide a wireless network deployment method, apparatus and system based on a virtual force, so as to simplify a deployment process of the wireless network.

According to a first aspect of the embodiments of the present disclosure, there is provided a wireless network deployment method, including:

initializing the wireless network to determine a deployment area of the wireless network and the number of access points needing to be deployed;

initializing positions of the access points, and dividing the deployment area into grids;

calculating a virtual force of each access point in the wireless network based on signal coverage of each grid;

calculating a movement position of each access point according to the virtual force of each access point;

performing edge controlling on each access point; and terminating processing in case that a terminating condition is satisfied, so as to obtain a deployment result of the wireless network.

According to a second aspect of the embodiments of the present disclosure, there is provided a wireless network deployment apparatus, including:

a first initializing unit configured to initialize the wireless network to determine a deployment area of the wireless network and the number of access points needing to be deployed;

a second initializing unit configured to initialize positions of the access points, and divide the deployment area into grids;

a first calculating unit configured to calculate a virtual force of each access point in the wireless network based on signal coverage of each grid;

a second calculating unit configured to calculate a movement position of each access point according to the virtual force of each access point;

an edge controlling unit configured to perform edge controlling on each access point; and a judging unit configured to judge whether a terminating condition is satisfied, and terminate processing in case that the terminating condition is satisfied, so as to obtain a deployment result of the wireless network.

According to a third aspect of the embodiments of the present disclosure, there is provided a computer system, including a wireless network deployment apparatus, the wireless network deployment apparatus being configured to:

initialize the wireless network to determine a deployment area of the wireless network and the number of access points needing to be deployed;

initialize positions of the access points, and divide the deployment area into grids;

calculate a virtual force of each access point in the wireless network based on signal coverage of each grid;

calculate a movement position of each access point according to the virtual force of each access point;

perform edge controlling on each access point; and terminate processing in case that a terminating condition is satisfied, so as to obtain a deployment result of the wireless network.

According to another aspect of the embodiments of the present disclosure, there is provided a computer-readable program, wherein when the program is executed in a wireless network deployment apparatus, the program enables a computer to carry out the method as described in the first aspect in the apparatus.

According to still another aspect of the embodiments of the present disclosure, there is provided a storage medium in which a computer-readable program is stored, wherein the computer-readable program enables a computer to carry out the method as described in the first aspect in a wireless network deployment apparatus.

An advantage of the embodiments of the present disclosure exists in that a deployment process of the wireless network is simulated as a dynamic physical process, movement of the access points along a direction of a resultant force of all repulsion forces and attractive forces is controlled following the principle that an overlapping covered area produces a repulsion force to access points and an uncovered area produces an attraction force to the access points, thereby simplifying the deployment process of the wireless network, with the calculation of the process being simple, and being fast in convergence.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear that the accompanying drawings in the following description are some embodiments of the present disclosure only, and a person of ordinary skill in the art may further obtain other drawings according to these accompanying drawings without making an inventive effort. In the drawings.

DETAILED DESCRIPTION

Figure 1:
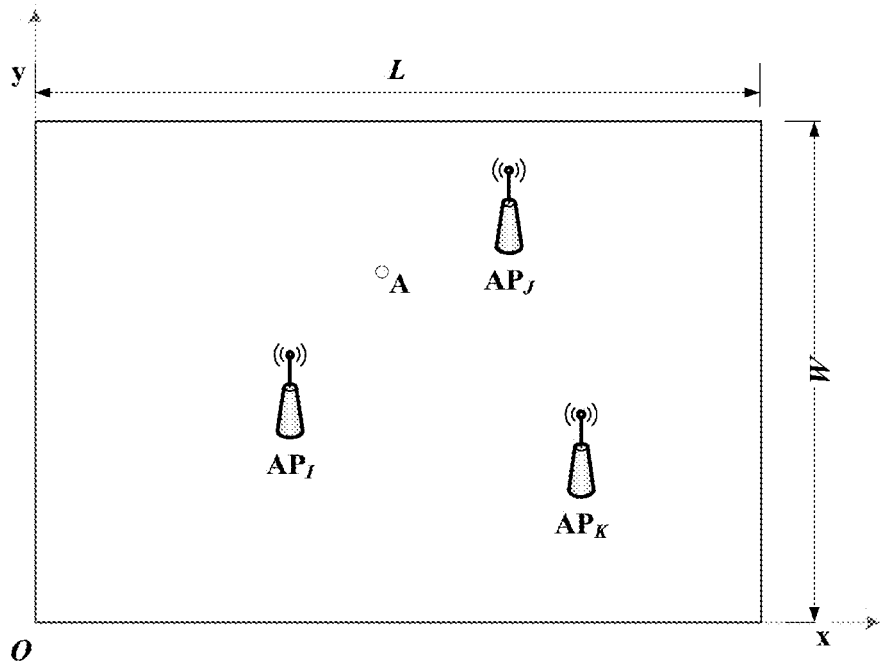
FIG. 1 is a schematic diagram of a deployment scenario of a wireless network.

Reference will now be made in detail to the embodiments, examples of which are illustrated in the accompanying drawings, wherein like reference numerals refer to the like elements throughout. The embodiments are described below to explain the present invention by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of the present disclosure, for the convenience of description, access points denote infrastructures of a wireless network, and terminal equipment denotes wireless equipment that is covered and provided with services.

FIG. 1 is a schematic diagram of a deployment scenario of a wireless network. As shown in FIG. 1, the wireless network needs to be deployed in an area with a length L and a width W. The network contains N access points, $AP_1, AP_2, \ldots, AP_N$, respectively, positions of which being $P_1, P_2, \ldots, P_N$, respectively. Intensity of radio signals sent by the access points decreases gradually during propagation. Randomly selecting a point A in the deployment area, intensity of a radio signal of the access point $AP_1$ at the point A is:

$$RSS_I^A = f(P_A, P_I), I \in \{1, 2, \ldots N\} \quad (1);$$

where, $P_A$ is a position of the point A, $P_I$ is a position of the access point $AP_I$, and f( ) is a wireless propagation model, which may be obtained through theoretical deduction, or may be obtained through experimental measurement.

In this example, if $RSS_I^A \geq RSS_{th}$, it is deemed that the point A is covered by the access point $AP_I$. The wireless network contains N access points, and only if the point A is covered by at least one access point, it will be deemed that this point is covered by the wireless network; otherwise, this point is not covered by the wireless network. If a randomly-selected point in the area satisfies a coverage condition, it will be deemed that this area is covered by the wireless network, and if a randomly-selected point in the area does not satisfy the coverage condition, it will be deemed that this area is not covered by the wireless network. An objective of deployment of the wireless network is to make a coverage area in the deployment area to be large as possible, and an uncovered area to be small as possible.

In order to increase the coverage of the wireless network, areas repeatedly covered by multiple access points should be reduced as possible. A radio signal is greatly subjected to a distance, intensity of the signal is high when the distance is short, and the intensity of the signal is low when the distance is long. When an access point moves towards an uncovered area away from an overlapped area, radio signals at the overlapped area shall be reduced, and radio signals at the uncovered area shall be increased, thereby expanding the covered area. In order to simulate this process, let the overlapped area produce a repulsive force to the access point, and the uncovered area produce an attractive force to the access point. As it is possible that there exist multiple different overlapped areas or uncovered areas in a neighboring area of the access point, it is subjected to multiple virtual forces. In the network, all the access points move along a direction of a resultant force of all the virtual forces to which they are subjected. When the network moves to a balanced status, the resultant force of all the virtual forces is zero. At this moment, the wireless network obtains an optimal coverage effect.

The method of the embodiment of the present disclosure shall be described below with reference to the drawings and particular embodiments.

Embodiment 1

Figure 2:
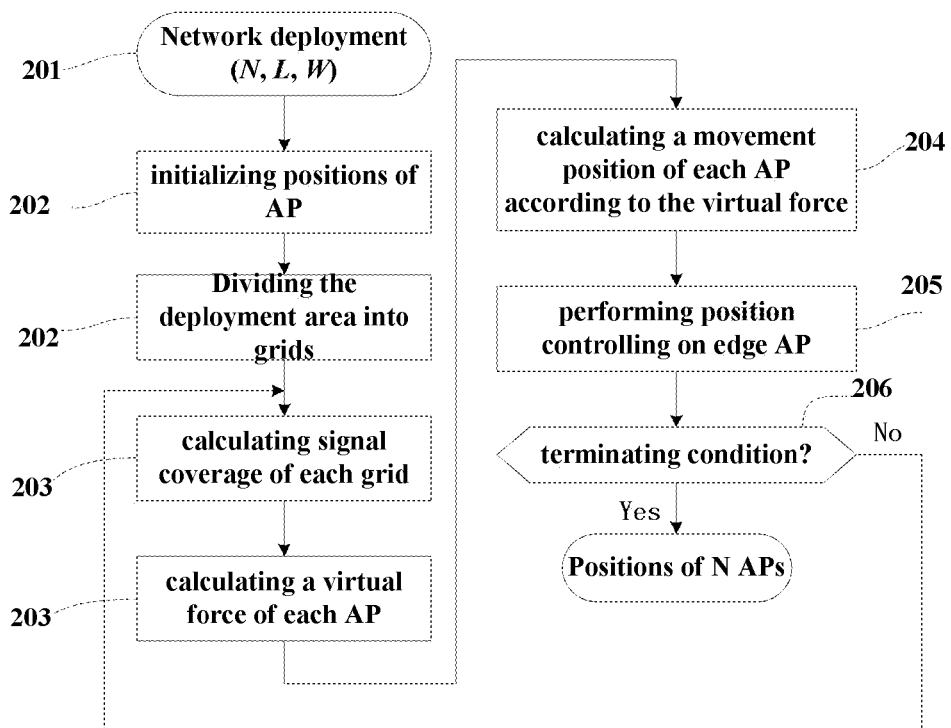
FIG. 2 is a flowchart of the wireless network deployment method.

An embodiment of the present disclosure provides a wireless network deployment method. FIG. 2 is a flowchart of the method. Referring to FIG. 2, the method includes:

step 201: initializing the wireless network to determine a deployment area of the wireless network and the number of access points needing to be deployed;

step 202: initializing positions of the access points, and dividing the deployment area into grids;

step 203: calculating a virtual force of each access point in the wireless network based on signal coverage of each grid;

step 204: calculating a movement position of each access point according to the virtual force of each access point;

step 205: performing edge controlling on each access point; and step 206: terminating processing in case that a terminating condition is satisfied, so as to obtain a deployment result of the wireless network.

In step 201, in initializing the wireless network, the number N of access points needing to be deployed and a length L and a width W of the deployment area need to be determined, and these parameters are taken as input, and at the end of the deployment, installation positions of N access points will be outputted.

In step 202, the positions of the access points need to be initialized, which are expressed as $P_I$, $I \in \{1, 2, \ldots, N\}$. The initial positions of the access points may be randomly deployed, and may also be deployed following a certain rule. Of course, all the access points must be positioned in a covered area where a user desires.

Figure 3:
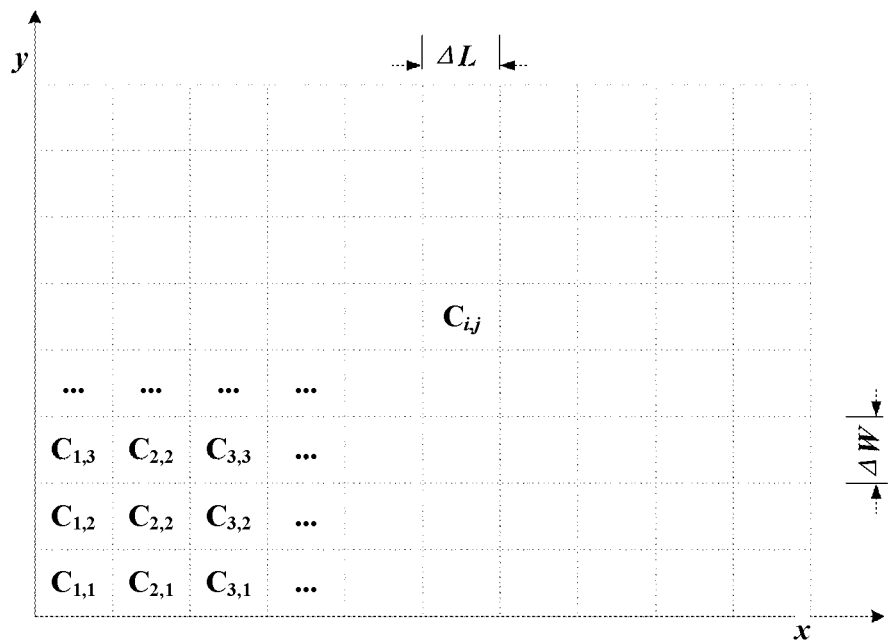
FIG. 3 is a schematic diagram of dividing the deployment area into grids.

In step 202, the deployment area needs to be divided into grids, that is, the whole deployment area is divided into small grids with identical sizes. As shown in FIG. 3, a length of each grid is $\Delta L$, and a width thereof is $\Delta W$. In a direction of the x axis, $n_x$ grids may be divided, $n_x = \lceil L/\Delta L \rceil$; and in a direction of the y axis, $n_y$ grids may be divided, $n_y = \lceil W/\Delta W \rceil$; where, $\lceil x \rceil$ is a maximum integer greater than x. Hence, after grid division, the deployment area is divided into total $n = n_x \times n_y$ grids. For the convenience of calculation and citation, the grids shall be denoted by serial numbers in the directions of the x axis and the y axis. A grid $C_{i,j}$ is an i-th gird in the x axis and a j-th grid in the y axis. A position of the grid $C_{i,j}$ is denoted by a position of its central point $P_{i,j}^c = (x_i, y_i)$; wherein, $$\begin{cases} x_i = (i-1)\Delta L + 0.5\Delta L \\ y_i = (i-1)\Delta W + 0.5\Delta W \end{cases} \quad (2)$$

According to Formula (1) for calculating signal intensity, $RSS_I^c(i,j)$ is signal intensity of the access point $AP_I$ at the grid $C_{i,j}$, and, $$RSS_I^c(i,j) = f(P_{i,j}^c, P_I), I \in \{1, 2, \ldots, N\}, i \in \{1, 2, \ldots, n_x\},$$
$$j \in \{1, 2, \ldots, n_y\} \quad (3).$$

Likewise, if $RSS_I^c(i,j) \geq RSS_{th}$, the grid $C_{i,j}$ is covered by the access point $AP_I$; otherwise, it is not covered.

In this embodiment, a grid $C_I^{AP}$ where the access point $AP_I$ is located is a grid most close to the position of the access point. If the position of the access point $AP_I$ is $P_I = (x, y)$, then $C_I^{AP} = C_{mn}$; where, $$\begin{cases} m = \lceil x/\Delta L \rceil \\ n = \lceil y/\Delta W \rceil \end{cases} \quad (4)$$

Figure 4:
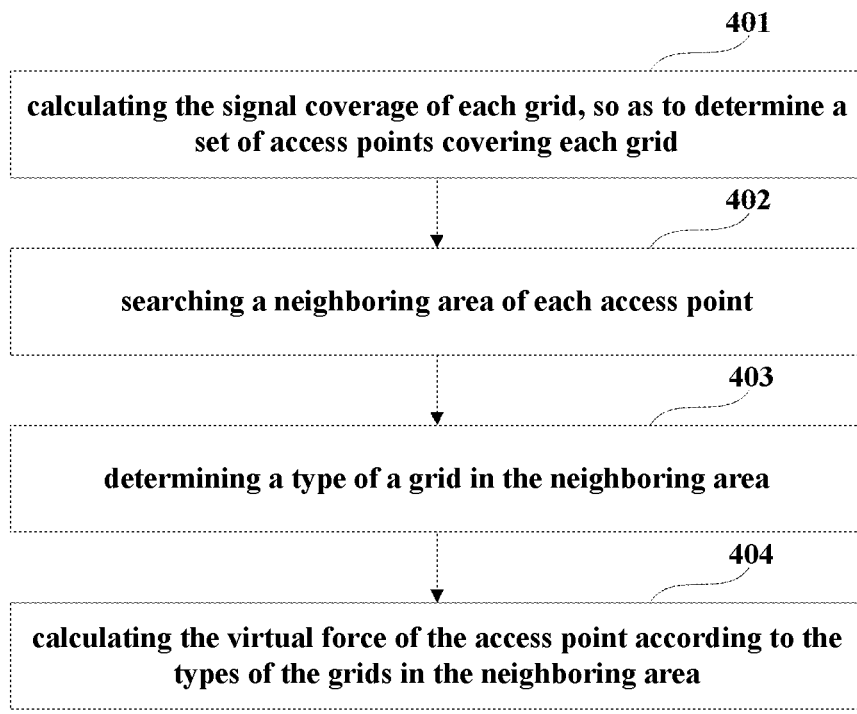
FIG. 4 is a flowchart of a method for calculating a virtual force.

In step 203, the virtual force of each access point in the wireless network may be calculated according to the method of FIG. 4 based on signal coverage of each grid. Referring to FIG. 4, the method includes:

step 401: calculating the signal coverage of each grid, so as to determine a set of access points covering each grid;

step 402: searching a neighboring area of each access point;

step 403: determining that a type of a grid in the neighboring area is being not covered by any access point, being covered by the access point only, being covered by other access points or being covered by the access point and other access points in an overlapped manner; and step 404: calculating the virtual force of the access point according to the types of the grids in the neighboring area.

Figure 5:
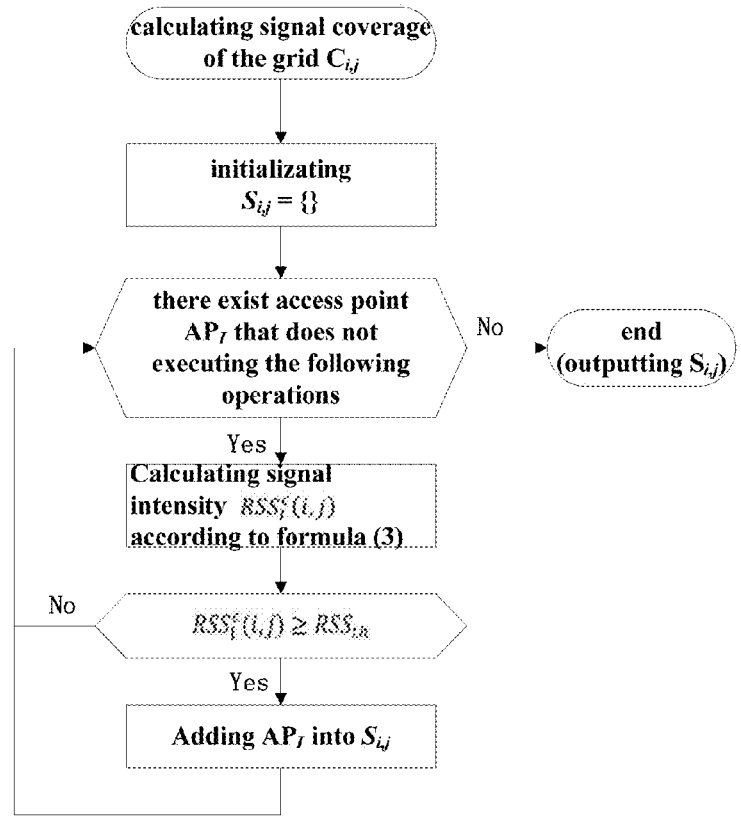
FIG. 5 is a flowchart of calculating signal coverage of grids.

In step 401, as described above, the deployment area is divided into n grids. In order to calculate signal coverage of the grids, the operational flow in FIG. 5 shall be performed on all the grids. In FIG. 5, $S_{i,j}$ is a set of access points covering the grid $C_{i,j}$, that is, signal intensity of the access points in the set reaching the grid $C_{i,j}$ is greater than a threshold value $RSS_{th}$. If $S_{i,j}$ is empty, it shows that $C_{i,j}$ is not covered by any access point; if the number of access points in $S_{i,j}$ is 1, it shows that $C_{i,j}$ just is covered by one access point; and if the number of access points in $S_{i,j}$ is greater than 1, it shows that $C_{i,j}$ is covered by multiple access points in an overlapped manner.

In this embodiment, each grid in the deployment area produces a virtual force to the access points according to signal coverage of itself. From the viewpoint of an access point, only a grid close to the access point produces a virtual force to it. Thus, in step 402, a neighboring area of the access point is searched first.

Figure 6:
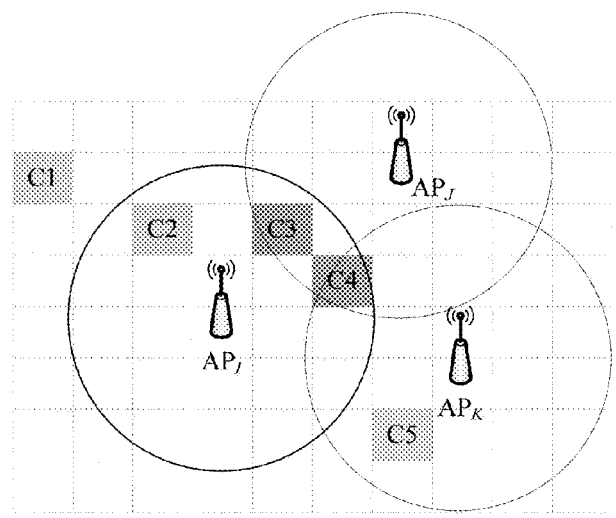
FIG. 6 is a schematic diagram of a neighboring area of an access point.

FIG. 6 is a schematic diagram of a neighboring area of an access point. As shown in FIG. 6, the grids around the access point may be divided into four types according to signal coverage: a grid $B_I^0$ not covered by any access point, a grid $B_I^1$ covered by a current access point only, a grid $B_I^2$ covered by a current access point and other access points at the same time, and a grid $B_I^3$ covered by other access points. As shown in FIG. 6, there are three access points, $AP_I$, $AP_J$ and $AP_K$, in the covered area. In this example, for the access point $AP_I$, a grid C1 is not covered by any access point, a grid C2 is covered by a current access point only, a grid C3 is covered by $AP_I$ and $AP_J$ at the same time, a grid C4 is covered by $AP_I$, $AP_J$ and $AP_K$ at the same time, and a grid C5 is not covered by the current access point, and is covered by $AP_K$ only.

Figure 7:
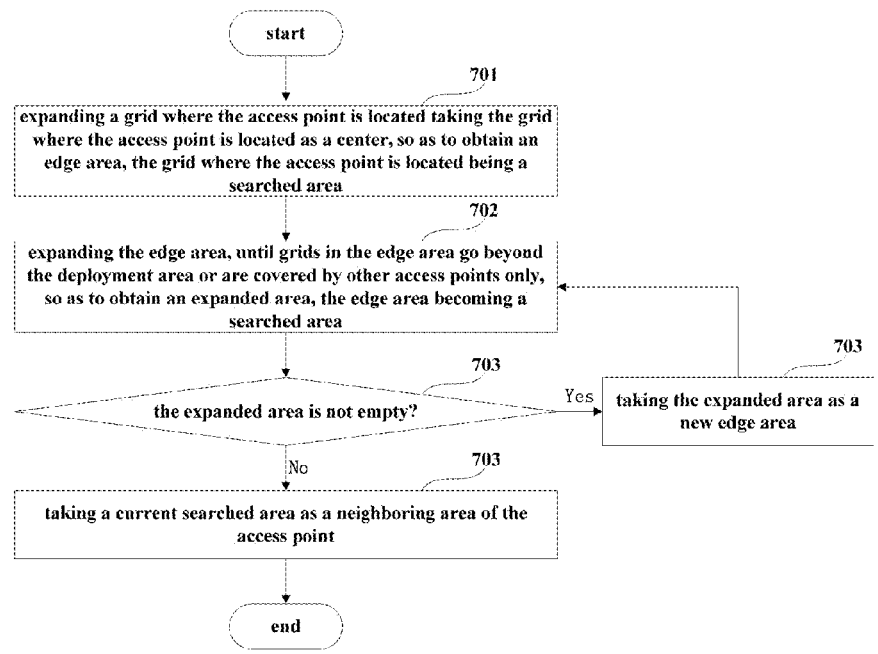
FIG. 7 is a flowchart of expanding an edge area of an access point.

FIG. 7 is a flowchart of searching a neighboring area of an access point. Referring to FIG. 7, the flow includes:

step 701: expanding a grid where the access point is located taking the grid where the access point is located as a center, so as to obtain an edge area, the grid where the access point is located being a searched area;

step 702: expanding the edge area, until grids in the edge area go beyond the deployment area or are covered by other access points only, so as to obtain an expanded area, the edge area becoming a searched area; and step 703: performing expansion taking the expanded area as a new edge area if the expanded area is not empty, that is, turning back to step 702; otherwise, taking a current searched area as a neighboring area of the access point.

Figure 8:
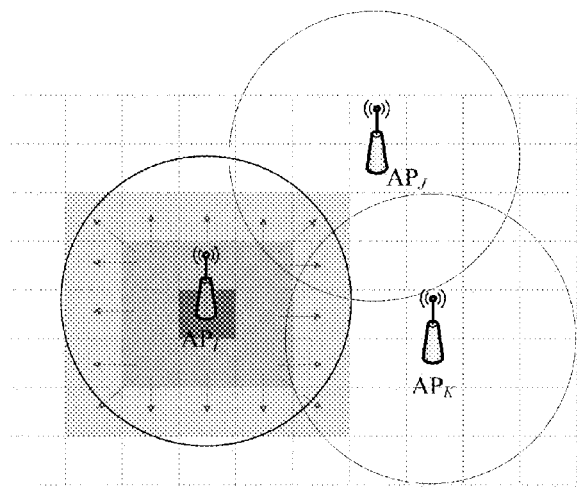
FIG. 8 is a schematic diagram of expanding an edge area of an access point.

FIG. 8 is a schematic diagram of searching a neighboring area of an access point. As described above, in this search process, areas taking the grid where the access point is located as a center are expanded continuously. FIG. 8 shows an example of searching a neighboring area of the access point $AP_I$. In this search process, grids around $AP_I$ constitute three sets, which are an area $E_I$ where the search has been performed, an edge area $E'_I$ that that is searched and area $E''_I$ that is expanded. In the example shown in FIG. 8, the grid where the access point $AP_I$ is located is a grid where the search has been performed, a circle of grids out of this grid are edge grids, and a circle of grids out of the edge grids are expanded grids.

Figure 9:
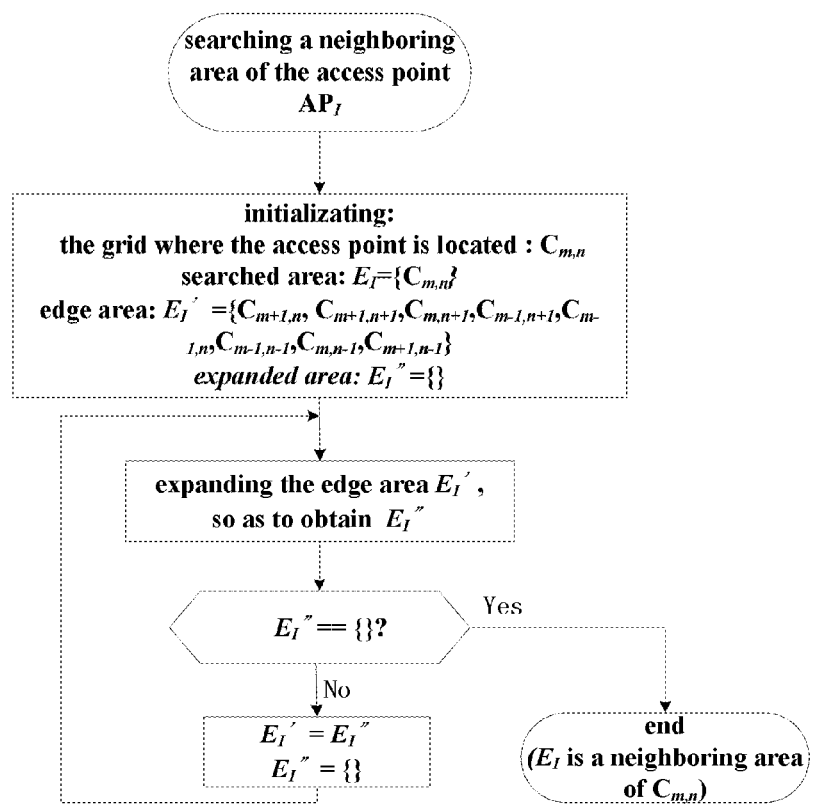
FIG. 9 is a flowchart of an implementation of searching a neighboring area of an access point.

In this embodiment, the search of the neighboring area of the access point is an iterative procedure. FIG. 9 is a flowchart of searching a neighboring area of the access point $AP_I$. As shown in FIG. 9, at the beginning of the search, the grid $C_{m,n}$ where the access point $AP_I$ is located is calculated according to Formula (4) first. In initialization, the grid $C_{m,n}$ is designated as the area $E_I$ where the search has been performed, and 8 grids in close proximity to it are designated as the edge area $E'_I$. Thereafter, the edge area is expanded, so as to obtain the expanded area $E''_I$, and at the same time, the grids in the expanded edge area are incorporated into the area where the search has been performed. When the expanded area is empty, the search process is terminated, and the area $E_I$ where the search has been performed is a neighboring area of the access point $AP_I$.

Figure 10:
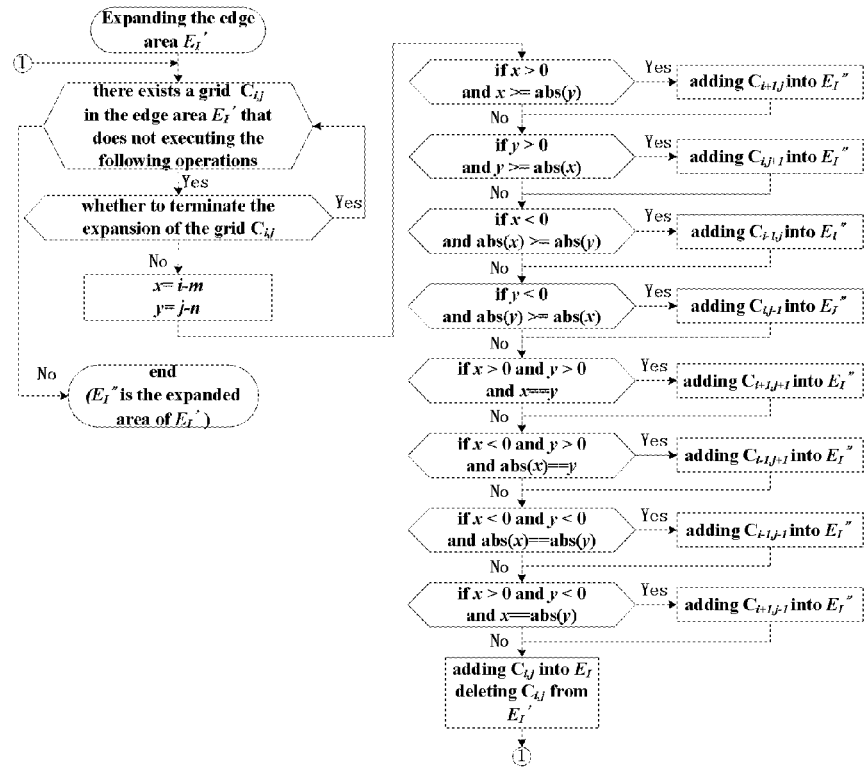
FIG. 10 is a flowchart of an implementation of expanding an edge area.

FIG. 10 is a flowchart of an implementation of expanding the edge area $E'_I$ in this example. As shown in FIG. 10, $E'_I$ is the edge area of the access point $AP_I$. As shown in FIG. 10, in this implementation, let x=i−m, and y=j−n, if x is greater than 0, and x is greater than or equal to an absolute value of y, it shows that the grid $C_{i,j}$ is to the right of the grid $C_{m,n}$ where the access point $AP_I$ is located, and area may be expanded rightward by one grid, a grid $C_{i+1,j}$ may be added into a set of the expanded area $E''_I$; likewise, if y is greater than 0, and y is greater than or equal to an absolute value of x, it shows that the grid $C_{i,j}$ is above the grid $C_{m,n}$ where the access point $AP_I$ is located, and area may be expanded upward by one grid, a grid $C_{i,j+1}$ may be added into the set of the expanded area $E''_I$; if x is less than 0, and an absolute value of x is greater than or equal to an absolute value of y, it shows that the grid $C_{i,j}$ is to the left of the grid $C_{m,n}$ where the access point $AP_I$ is located, and area may be expanded leftward by one grid, a grid $C_{i-1,j}$ may be added into the set of the expanded area $E''_I$; if y is less than 0, and an absolute value of y is greater than or equal to an absolute value of x, it shows that the grid $C_{i,j}$ is under the grid $C_{m,n}$ where the access point $AP_I$ is located, and area may be expanded downward by one grid, a grid $C_{i,j-1}$ may be added into the set of the expanded area $E''_I$; if x is greater than 0, y is greater than 0, and x is equal to y, it shows that the grid $C_{i,j}$ is to the top right of the grid $C_{m,n}$ where the access point $AP_I$ is located, and area may be expanded top rightward by one grid, a grid $C_{i+1,j+1}$ may be added into the set of the expanded area $E''_I$; if x is less than 0, y is greater than 0, and an absolute value of x is equal to y, it shows that the grid $C_{i,j}$ is to the top left of the grid $C_{m,n}$ where the access point $AP_I$ is located, and area may be expanded top leftward expansion by one grid, a grid $C_{i-1,j+1}$ may be added into the set of the expanded area $E''_I$; if x is less than 0, y is less than 0, and an absolute value of x is equal to an absolute value of y, it shows that the grid $C_{i,j}$ is to the bottom left of the grid $C_{m,n}$ where the access point $AP_I$ is located, and area may be added bottom leftward by one grid, a grid $C_{i-1,j-1}$ may be added into the set of the expanded area $E''_I$; if x is greater than 0, y is less than 0, and x is equal to an absolute value of y, it shows that the grid $C_{i,j}$ is to the bottom right of the grid $C_{m,n}$ where the access point $AP_I$ is located, and area may be expanded bottom rightward by one grid, a grid $C_{i+1,j-1}$ may be added into the set of the expanded area $E''_I$; and if all the above conditions are unsatisfied, the grid $C_{i,j}$ is added into the area $E_I$ where the search has been performed, and is deleted from the edge area E'$_I$, and operation is performed on a next grid in the edge area E'$_I$. The expansion manner in FIG. 10 is an example only, and this embodiment is not limited thereto.

Figure 11:
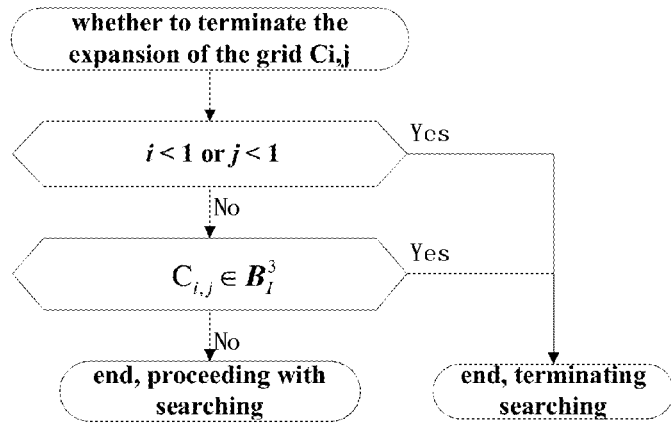
FIG. 11 is a flowchart of judging whether to terminate a search of an edge area.

In the implementation of FIG. 10, alternatively, whether the grids in the edge area E'$_I$ needs to be expanded may be judged. FIG. 11 is a flowchart of judging whether to terminate a search of an edge area. As shown in FIG. 11, the grid C$_{i,j}$ is a grid in the edge area E'$_I$ of the access point AP$_I$. If i<1 or j<1, the grid C$_{i,j}$ goes beyond the coverage area, and the expansion of the grid C$_{i,j}$ should be terminated; if C$_{i,j}$∈B$_I^3$, that is, the grid C$_{i,j}$ is not covered by the current access point AP$_I$, but is covered by another access point, the expansion of the grid C$_{i,j}$ should also be terminated at this moment; and in all other cases, the grid C$_{i,j}$ should be expanded.

In step 403, a type of the grids in the neighboring area of the access point may be determined according to the set of the access points covering each grid obtained in step 401 (that is, the access points by which each grid is covered) and the neighboring area of the access point obtained in step 402.

Figure 12:
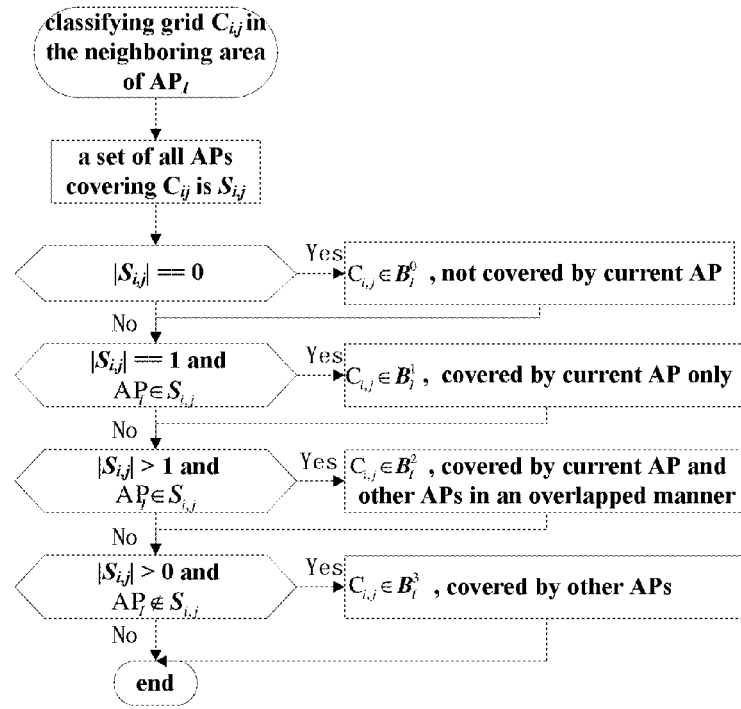
FIG. 12 is a flowchart of classifying grids in a neighboring area of an access point.

As described above, the set S$_{i,j}$ of the access points covering each grid C$_{i,j}$ may be obtained according to step 401. The set can be used to classify grids in the neighboring area of the access point. FIG. 12 is a classifying flowchart. In FIG. 12, |S$_{i,j}$| denotes the number of elements in the set. As shown in FIG. 12, if the set S$_{i,j}$ of the access points covering the grid C$_{i,j}$ is empty, it shows that the grid C$_{i,j}$ is not covered by the current access point; if the set S$_{i,j}$ of the access points covering the grid C$_{i,j}$ is 1 and the access point AP$_I$ is located within the set S$_{i,j}$, it shows that the grid C$_{i,j}$ is covered by the current access point only; if the set S$_{i,j}$ of the access points covering the grid C$_{i,j}$ is greater than 1 and the access point AP$_I$ is located within the set S$_{i,j}$, it shows that the grid C$_{i,j}$ is covered by the current access point and other access points in an overlapped manner; and if the set S$_{i,j}$ of the access points covering the grid C$_{i,j}$ is greater than 0 and the access point AP$_I$ is not located within the set S$_{i,j}$, it shows that the grid C$_{i,j}$ is covered by (one or more) other access points.

As described above, according to step 402, which grids are in the neighboring area of the access point can be known. It may be determined according to the manner of FIG. 12 that a type of the grids in the neighboring area of the access point is that it is not covered by any access point, covered by the access point only, covered by other access points, or covered by the access point and other access points in an overlapped manner, wherein, in a general case, the neighboring area of the access point contains no grid covered by other access points.

Figure 13:
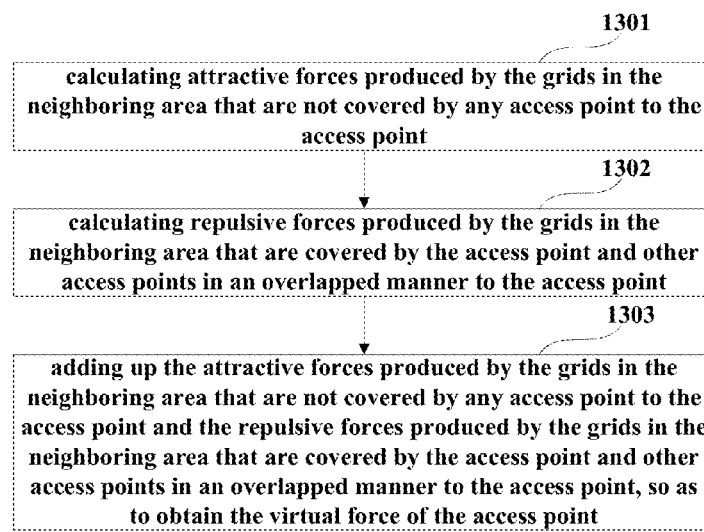
FIG. 13 is a flowchart of calculating the virtual force in FIG. 4.

In step 404, the neighboring area of the access point and types of the grids in the neighboring area are obtained, the virtual force to which the access point is subjected may be calculated accordingly. FIG. 13 is a flowchart of calculating the virtual force. Referring to FIG. 13, the flow includes:

step 1301: calculating attractive forces produced by the grids in the neighboring area that are not covered by any access point to the access point;

step 1302: calculating repulsive forces produced by the grids in the neighboring area that are covered by the access point and other access points in an overlapped manner to the access point; and step 1303: adding up the attractive forces produced by the grids in the neighboring area that are not covered by any access point to the access point and the repulsive forces produced by the grids in the neighboring area that are covered by the access point and other access points in an overlapped manner to the access point, so as to obtain the virtual force of the access point.

In this embodiment, according to step 402, each access point obtains a neighboring area by searching. During the search, all grids covered by the other access points but not by the current access point are not contained in the neighboring area. Still taking what described above as an example, the grids in the neighboring area E$_I$ of the access point AP$_I$ are classified into three types: grids covered by no access point being located in a set B$_I^0$, grids covered by only the current access point being located in a set B$_I^1$, and grids covered by the current access point and other access points being located in a set B$_I^2$. In calculating the virtual force, the grids in B$_I^0$ will produce attractive forces to the access points, the grids in B$_I^1$ will produce friction forces to the access points, and the grids in B$_I^2$ will produce repulsive forces to the access points.

In this embodiment, if the grid C$_{i,j}$ belongs to the uncovered area B$_I^0$ of the access point AP$_I$, that is, C$_{i,j}$ is a grid covered by no access point, its position is P$_{i,j}$, and a position of the access point AP$_I$ is P$_I$, the virtual force (the attractive force) produced by the grid C$_{i,j}$ to the access point is:

$$F_{i,j} = \frac{P_{i,j} - P_I}{\|P_{i,j} - P_I\|}; \tag{5}$$

where, $\|P_{i,j}-P_I\|$ is a distance from the grid to the access point AP$_I$.

In this embodiment, if a grid C$_{p,q}$ belongs to the overlapping covered area B$_I^2$ of the access point AP$_I$, that is, C$_{p,q}$ is a grid covered by the access point and the other access points in an overlapped manner, its position is P$_{p,q}$, for example, the grid C$_{p,q}$ is covered by multiple access points, which are AP$_1$, AP$_2$, ..., AP$_M$, respectively, their positions being P$_1$, P$_2$, ..., P$_M$, respectively, where, M≥2, and positions of all the access points covering the grid C$_{p,q}$ are P$_c$, and $$P_c = \frac{\sum_{i=1}^{M} P_i}{M}; \tag{6}$$

then the virtual force (the repulsive force) produced by the grid C$_{p,q}$ to the access point AP$_I$ is:

$$F_{p,q} = \frac{P_I - P_c}{\|P_I - P_c\|}; \tag{7}$$

where, P$_I$ is a position of the access point.

In this embodiment, after obtaining the attractive force and the repulsive force, the virtual force to which the access point AP$_I$ is subjected may be calculated accordingly; wherein the virtual force F$_I$ applied to the access point AP$_I$ is a resultant force of all virtual forces produced by all the grids in the uncovered area B$_I^0$ (a set of grids in the neighboring area covered by no access point) and the overlapping covered area B$_I^2$ (a set of grids in the neighboring area covered by the access point and the other access points in an overlapped manner), that is, $$F_I = \sum_{C_{ij} \in B_I^0} w_{i,j} F_{i,j} + \sum_{C_{qp} \in B_I^2} w_{p,q} F_{p,q}; \quad (8)$$

where, $w_{i,j}$ and $w_{p,q}$ are weighted values, $w_{i,j} \in [0,1]$, $w_{p,q} \in [0,1]$.

In this embodiment, the grids covered only by the current access point (the grids in the set $B_I^1$) will produce friction forces to the access point, and have an effect on a movement step of the access point, which shall be described below in detail.

In step 204, the virtual forces to which the access points are subjected are obtained according to step 203, and movement positions of the access points may be calculated accordingly.

Figure 14:
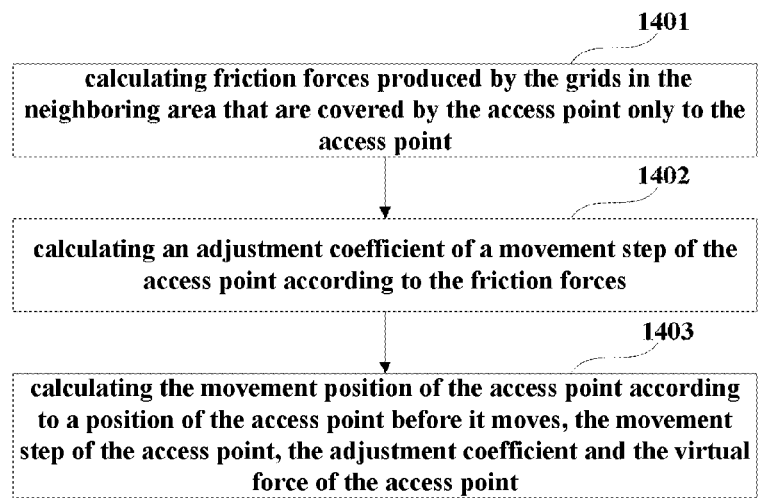
FIG. 14 is a flowchart of calculating a movement position in FIG. 2.

FIG. 14 is a flowchart of an implementation of calculating a movement position of an access point. Referring to FIG. 14, the flow includes:

step 1401: calculating friction forces produced by the grids in the neighboring area that are covered by the access point only to the access point;

step 1402: calculating an adjustment coefficient of a movement step of the access point according to the friction forces; and step 1403: calculating the movement position of the access point according to a position of the access point before it moves, the movement step of the access point, the adjustment coefficient and the virtual force of the access point.

In this embodiment, the virtual force applied to the access point $AP_I$ is $F_I$, its current position is $P_I$, and the access point will move its positions according to the force to which it is subjected.

In this embodiment, as described above, the grids covered by the access point only produce friction forces to the access point, and a formula for calculating the friction force to which the access point $AP_I$ is subjected is:

$$F_I^f = |B_I^1| \quad (9);$$

where, $B_I^1$ is a set of the grids in the neighboring area covered only by the access point, and $|B_I^1|$ is the number of the grids in the neighboring area covered only by the access point.

In this embodiment, the access point will move along a direction of the force to which it is subjected, and a position $P'_I$ of the access point after moving may be obtained through calculation by using the formula below:

$$P'_I = P_I + k_I \Delta P \frac{F_I}{\|F_I\|}; \quad (10)$$

where, $P'_I$ is the position of the access point after moving, $P_I$ is the position of the access point before moving, $\Delta P$ is the movement step of the access point, $F_I$ is the virtual force to which the access point is subjected, and $k_I$ is the adjustment coefficient, which is related to the friction force to which the access point is subjected, the larger the friction force to which the access point is subjected is, the smaller the $k_I$ is; otherwise, the bigger the $k_I$ is. An implementation of calculating the $k_I$ may be:

$$k_I = 1 - F_I^f / F_{max}^f \quad (11)$$

where, $F_{max}^f$ is a maximum value of the friction forces to which all the access points in the wireless network are subjected.

In this embodiment, the access points located at the boundary of the covered area are often subjected to an internal thrust and move towards outside of the covered area, and even completely get out of the movement area sometimes. In order avoid occurrence of such a case, the movement of the access points located at the boundary needs to be controlled in step 205.

Figure 15:
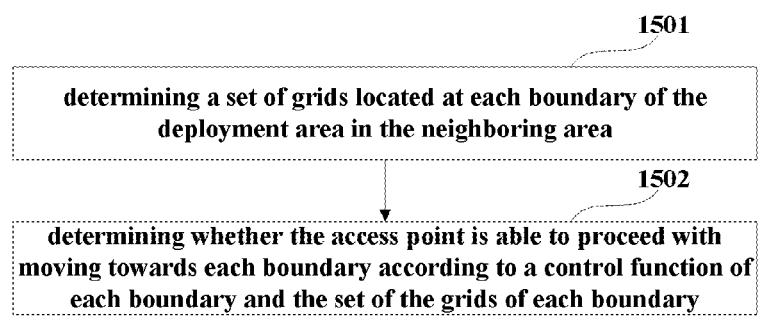
FIG. 15 is a flowchart of controlling the boundary in FIG. 2.

FIG. 15 is a flowchart of performing edge controlling on access points. Referring to FIG. 15, the flow includes:

step 1501: determining a set of grids located at each boundary of the deployment area in the neighboring area; and step 1502: determining whether the access point is able to proceed with moving towards each boundary according to a control function of each boundary and the set of the grids of each boundary.

Figure 16:
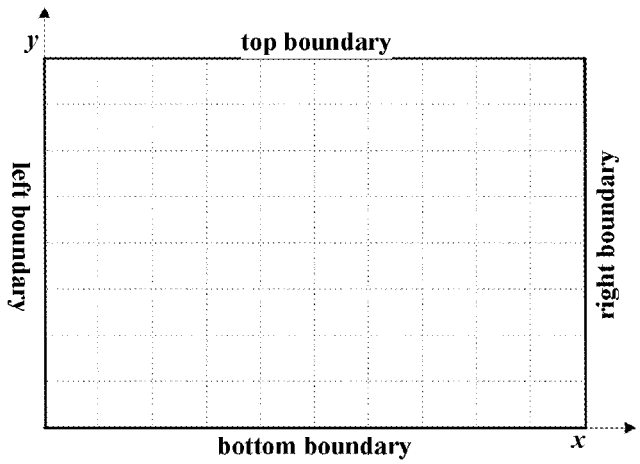
FIG. 16 is a schematic diagram of a boundary in a deployment area.

In step 1501, the deployment area being in a shape of rectangle is taken as an example. FIG. 16 is a schematic diagram of boundaries of the deployment area. As shown in FIG. 16, the deployment area has four boundaries, which are a left boundary, a right boundary, a top boundary, and a bottom boundary, respectively. As the grids in the neighboring area of the access point are known, the set of the grids located at the boundaries of the deployment area in the neighboring area may be determined.

Figure 17:
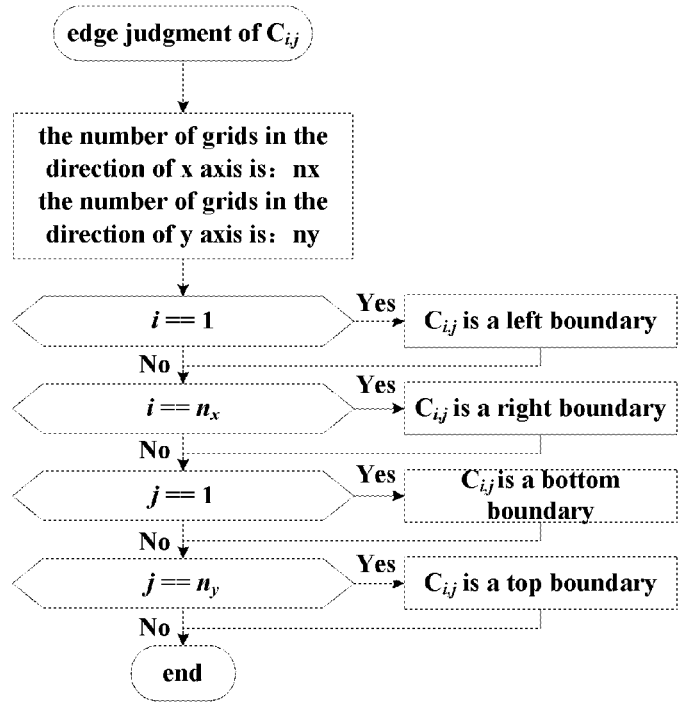
FIG. 17 is a flowchart of judging whether a grid is located at a boundary.

In step 1501, for any grid $C_{i,j}$ in the deployment area, whether the grid belongs to an edge position may be judged according to a serial number of the grid by using the method shown in FIG. 17. As shown in FIG. 17, if i is equal to 1, it may be determined that the grid is a left boundary; if i is equal to the number of grids in the direction of the x axis, it may be determined that the grid is a right boundary; if j is equal to 1, it may be determined that the grid is a bottom boundary; and if j is equal to the number of grids in the direction of the y axis, it may be determined that the grid is a top boundary.

In this embodiment, as described above, as the neighboring area $E_I$ of the access point $AP_I$ has been obtained, edge grids in types $B_I^1$ and $B_I^2$ in the neighboring area $E_I$ may be determined according to FIG. 17, and these edge grids may be classified into four classes, $E_I^l$, $E_I^r$, $E_I^t$ and $E_I^b$; wherein, $E_I^l$ is a set of grids located at the left boundary in the neighboring area $E_I$ of the access point $AP_I$, $E_I^r$ is a set of grids located at the right boundary, $E_I^t$ is a set of grids located at the top boundary, and $E_I^b$ is a set of grids located at the bottom boundary.

In step 1502, movement of the access point near a boundary of the deployment area may be controlled by constructing a boundary control function. In an implementation, control functions of boundaries may be:

$$g_l: (E_I^l, E_I^r, E_I^t, E_I^b) \rightarrow \{\text{True, False}\}$$

$$g_r: (E_I^l, E_I^r, E_I^t, E_I^b) \rightarrow \{\text{True, False}\}$$

$$g_t: (E_I^l, E_I^r, E_I^t, E_I^b) \rightarrow \{\text{True, False}\}$$

$$g_b: (E_I^l, E_I^r, E_I^t, E_I^b) \rightarrow \{\text{True, False}\} \quad (12);$$

where, $g_l(\ )$ controls movement of the access point at the left boundary, $g_r(\ )$ controls movement of the access point at the right boundary, $g_t(\ )$ controls movement of the access point at the top boundary, and $g_b(\ )$ controls movement of the access point at the bottom boundary. The boundary control functions take adjacent grids of access point at each boundary as input, and their output is True or False. Taking $g_l(\ )$ as an example, if its output is True, the access point may move towards the left boundary; otherwise, it cannot move towards the left boundary. As an implementation, the boundary control functions may be implemented by using threshold values. Still taking $g_l(\ )$ as an example, it may be defined as:

$$g_l(E_l^l, E_l^r, E_l^t, E_l^b) = \begin{cases} \text{True}, & \text{if } |E_l^l| < T_l \\ \text{False}, & \text{others} \end{cases} \quad (13)$$

where, $T_l$ is a threshold value of the left boundary. In the neighboring area of the access point, if the number $|E_l^l|$ of the grids located at the left boundary is less than $T_l$, the left boundary control function outputs True, and the access point cannot move towards the left boundary; otherwise, it outputs False, and the access point may move towards the left boundary. Likewise, the other three boundary control functions may also be defined.

Figure 18:
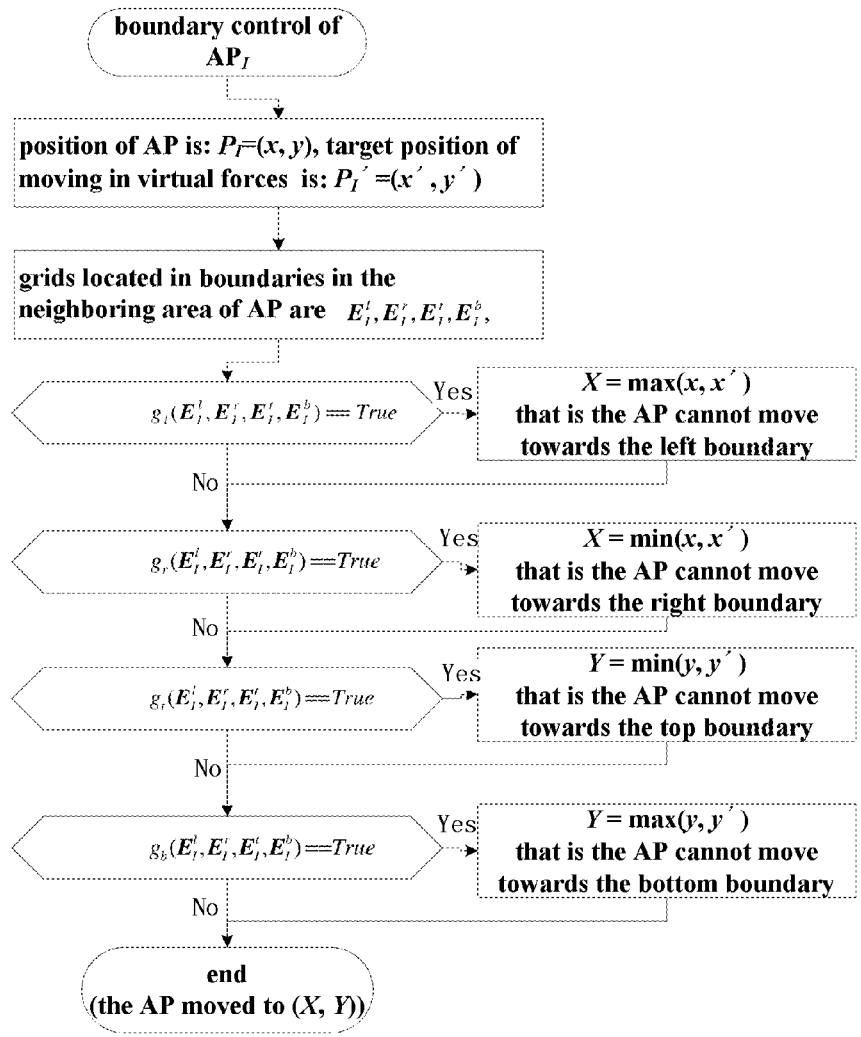
FIG. 18 is a flowchart of an implementation of controlling a boundary.

FIG. 18 is a flowchart of performing boundary control. Likewise, this embodiment is not limited to the implementation of FIG. 18.

In this embodiment, alternatively, during the network deployment, whether the deployment process is terminated may be determined by judging a termination condition. In step 206, if the termination condition is satisfied, the deployment process is terminated; and if the termination condition cannot be satisfied, the steps of FIG. 2 are repeatedly executed.

In this embodiment, a threshold of a coverage rate, or a threshold of the number of operations, etc., may be used as the termination condition. The coverage rate refers to a proportion of grids covered by a signal of at least one access point in all grids in a deployment area. If the coverage rate is greater than the threshold of the coverage rate, the deployment is terminated; otherwise, the deployment is continued. The number of operations refers to the number of times of executing repeatedly the network deployment algorithm, that is the number of times of executing steps 202-205 in FIG. 2. And if the number of operations is greater than a threshold value, the network deployment is terminated; otherwise, the network deployment is continued.

In this embodiment, design of the termination condition may be a single rule, and may also be a complex rule combining multiple conditions.

With the method of this embodiment, a deployment process of the wireless network is simulated as a dynamic physical process, movement of the access points along a direction of a resultant force of all repulsion forces and attractive forces is controlled following the principle that an overlapping covered area produces a repulsion force to access points and an uncovered area produces an attraction force to the access points, thereby simplifying the deployment process of the wireless network, with the calculation of the process being simple, and being fast in convergence.

Embodiment 2

An embodiment of the present disclosure further provides a wireless network deployment apparatus. As principles of the apparatus for solving problems is similar to that of the method of Embodiment 1, the implementation of the method of Embodiment 1 may be referred to for the implementation of the apparatus, with identical parts being not going to be described herein any further.

Figure 19:
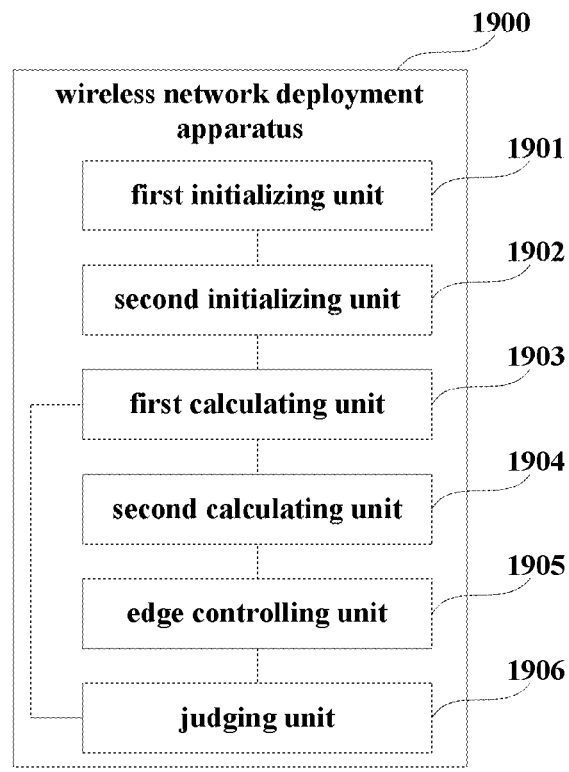
FIG. 19 is a schematic diagram of a structure of the wireless network deployment apparatus of this embodiment.

FIG. 19 is a schematic diagram of a structure of the wireless network deployment apparatus of this embodiment. Referring to FIG. 19, the apparatus 1900 includes a first initializing unit 1901, a second initializing unit 1902, a first calculating unit 1903, a second calculating unit 1904, an edge controlling unit 1905 and a judging unit 1906; wherein, the first initializing unit 1901 is configured to initialize the wireless network to determine a deployment area of the wireless network and the number of access points needing to be deployed;

the second initializing unit 1902 is configured to initialize positions of the access points, and divide the deployment area into grids;

the first calculating unit 1903 is configured to calculate a virtual force of each access point in the wireless network based on signal coverage of each grid;

the second calculating unit 1904 is configured to calculate a movement position of each access point according to the virtual force of each access point;

the edge controlling unit 1905 is configured to perform edge controlling on each access point;

and the judging unit 1906 is configured to judge whether a terminating condition is satisfied, and terminate processing in case that the terminating condition is satisfied, so as to obtain a deployment result of the wireless network.

Figure 20:
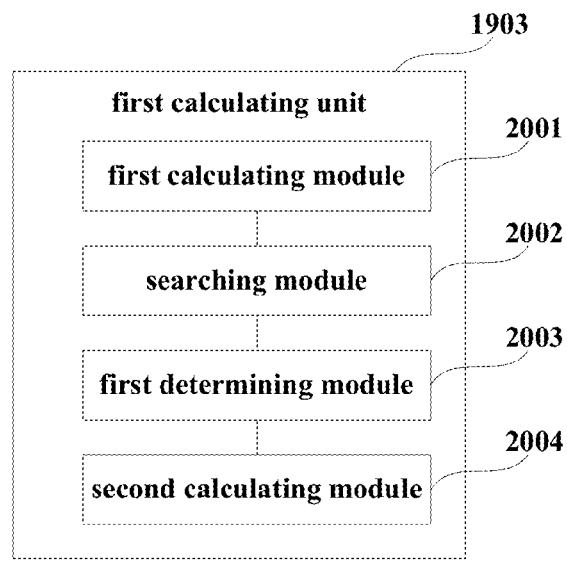
FIG. 20 is a schematic diagram of a structure of a first calculating unit.

In an implementation, as shown in FIG. 20, the first calculating unit 1903 may include a first calculating module 2001, a searching module 2002, a first determining module 2003 and a second calculating module 2004; wherein, the first calculating module 2001 is configured to calculate the signal coverage of each grid, so as to determine a set of access points covering each grid;

the searching module 2002 is configured to search a neighboring area of each access point;

the first determining module 2003 is configured to determine that a type of a grid in the neighboring area is being not covered by any access point, being covered by the access point only, being covered by other access points, or being covered by the access point and other access points in an overlapped manner;

and the second calculating module 2004 is configured to calculate the virtual force of the access point according to the types of the grids in the neighboring area.

Figure 21:
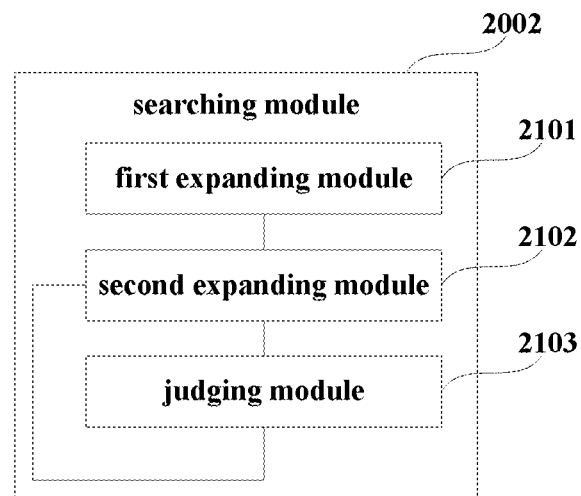
FIG. 21 is a schematic diagram of a structure of a searching module.

In an implementation, as shown in FIG. 21, the searching module 2002 may include a first expanding module 2101, a second expanding module 2102 and a judging module 2103; wherein, the first expanding module 2101 is configured to expand a grid where the access point is located taking the grid where the access point is located as a center, so as to obtain an edge area, the grid where the access point is located being a searched area;

the second expanding module 2102 is configured to expand the edge area, until grids in the edge area go beyond the deployment area or are covered by other access points only, so as to obtain an expanded area, the edge area becoming a searched area;

and the judging module 2103 is configured to judge whether the expanded area is not empty, and perform expansion by using the second expanding module 2102 taking the expanded area as a new edge area if the expanded area is not empty, otherwise, take a current searched area as a neighboring area of the access point.

Figure 22:
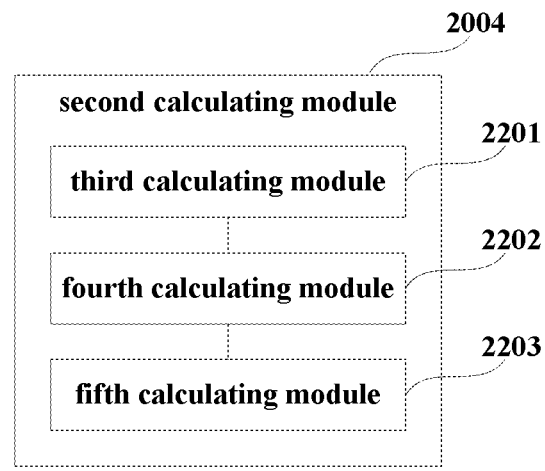
FIG. 22 is a schematic diagram of a structure of a second calculating module.

In an implementation, as shown in FIG. 22, the second calculating module 2004 may include a third calculating module 2201, a fourth calculating module 2202 and a fifth calculating module 2203; wherein, the third calculating module 2201 is configured to calculate attractive forces produced by the grids in the neighboring area that are not covered by any access point to the access point, wherein, the third calculating module 2201 may calculate the attractive forces by using Formula (5);

the fourth calculating module 2202 is configured to calculate repulsive forces produced by the grids in the neighboring area that are covered by the access point and other access points in an overlapped manner to the access point; wherein, the fourth calculating module 2202 may calculate the repulsive forces by using Formula (7);

and the fifth calculating module 2203 is configured to add up the attractive forces produced by the grids in the neighboring area that are not covered by any access point to the access point and the repulsive forces produced by the grids in the neighboring area that are covered by the access point and other access points in an overlapped manner to the access point, so as to obtain the virtual force of the access point; wherein, the fifth calculating module 2203 may calculate the attractive forces by using Formula (8).

Figure 23:
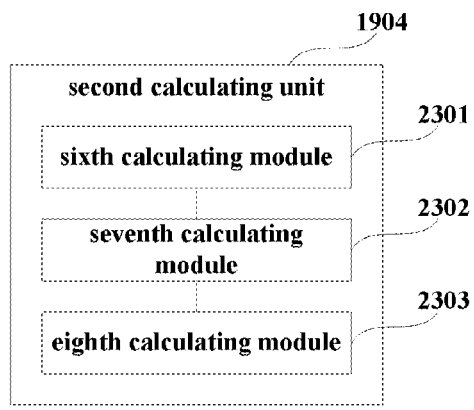
FIG. 23 is a schematic diagram of a structure of a second calculating unit.

In an implementation, as shown in FIG. 23, the second calculating module 1904 may include a sixth calculating module 2301, a seventh calculating module 2302 and an eighth calculating module 2303; wherein, the sixth calculating module 2301 is configured to calculate friction forces produced by the grids in the neighboring area that are covered by the access point only to the access point; wherein, the sixth calculating module 2301 may calculate the friction forces by using Formula (9), the seventh calculating module 2302 is configured to calculate an adjustment coefficient of a movement step of the access point according to the friction forces; wherein, the seventh calculating module 2302 may calculate the adjustment coefficient by using Formula (11);

and the eighth calculating module 2303 is configured to calculate the movement position of the access point according to a position of the access point before it moves, the movement step of the access point, the adjustment coefficient and the virtual force of the access point, wherein, the eighth calculating module 2303 may calculate the movement position by using Formula (10).

Figure 24:
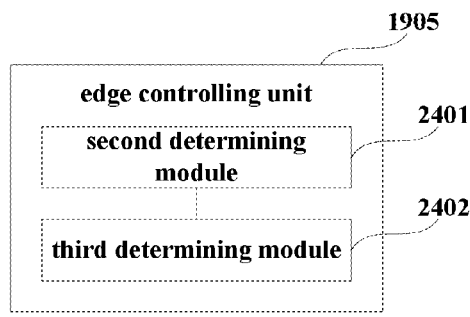
FIG. 24 is a schematic diagram of a structure of an edge controlling unit.

In an implementation, as shown in FIG. 24, the edge controlling unit 1904 may include a second determining module 2401 and a third determining module 2402; wherein, the second determining module 2401 is configured to determine a set of grids located at each boundary of the deployment area in the neighboring area;

and the third determining module 2402 is configured to determine whether the access point is able to proceed with moving towards each boundary according to a control function of each boundary and the set of the grids of each boundary.

With the apparatus of this embodiment, a deployment process of the wireless network is simulated as a dynamic physical process, movement of the access points along a direction of a resultant force of all repulsion forces and attractive forces is controlled following the principle that an overlapping covered area produces a repulsion force to access points and an uncovered area produces an attraction force to the access points, thereby simplifying the deployment process of the wireless network, with the calculation of the process being simple, and being fast in convergence.

Embodiment 3

An embodiment of the present disclosure further provides a computer system, including the wireless network deployment apparatus as described in Embodiment 2.

Figure 25:
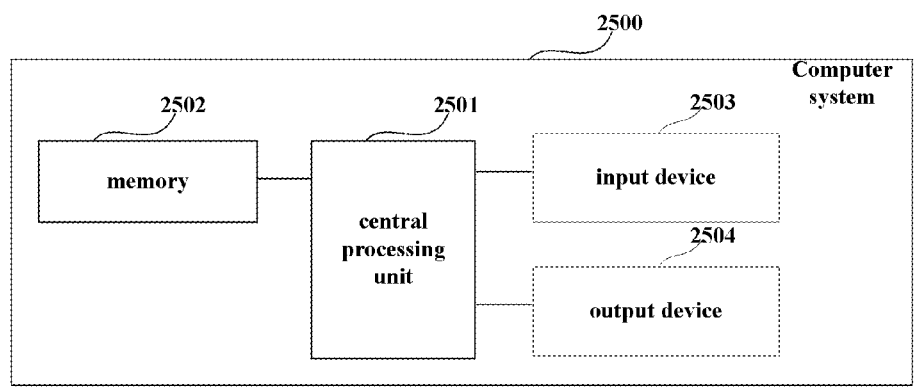
FIG. 25 is a schematic diagram of a structure of the computer system of this embodiment.

FIG. 25 is a schematic diagram of a structure of the computer system of this embodiment. As shown in FIG. 25, the computer system 2500 may include a central processing unit (CPU) 2501 and a memory 2502, the memory 2502 being coupled to the central processing unit 2501. The memory 2502 may store various data, and furthermore, store programs for information processing, and execute the programs under control of the central processing unit 2501.

In an implementation, the functions of the wireless network deployment apparatus described in Embodiment 2 may be integrated into the central processing unit 2501. In this implementation, the central processing unit 2501 may be configured to initialize the wireless network to determine a deployment area of the wireless network and the number of access points needing to be deployed; initialize positions of the access points, and divide the deployment area into grids; calculate a virtual force of each access point in the wireless network based on signal coverage of each grid; calculate a movement position of each access point according to the virtual force of each access point; perform edge controlling on each access point; and judge whether a terminating condition is satisfied, and terminate processing in case that the terminating condition is satisfied, so as to obtain a deployment result of the wireless network.

Alternatively, the central processing unit 2501 may further be configured to calculate the signal coverage of each grid, so as to determine a set of access points covering each grid; search a neighboring area of each access point; determine that a type of a grid in the neighboring area is being not covered by any access point, being covered by the access point only, being covered by other access points, or being covered by the access point and other access points in an overlapped manner; and calculate virtual force of the access point according to the types of the grids in the neighboring area.

Alternatively, the central processing unit 2501 may further be configured to expand a grid where the access point is located taking the grid where the access point is located as a center, so as to obtain an edge area, the grid where the access point is located being a searched area; expand the edge area, until grids in the edge area go beyond the deployment area or are covered by other access points only, so as to obtain an expanded area, the edge area becoming a searched area; and judge whether the expanded area is not empty, and perform expansion taking the expanded area as a new edge area if the expanded area is not empty, otherwise, take a current searched area as a neighboring area of the access point.

Alternatively, the central processing unit 2501 may further be configured to calculate attractive forces produced by the grids in the neighboring area that are not covered by any access point to the access point; calculate repulsive forces produced by the grids in the neighboring area that are covered by the access point and other access points in an overlapped manner to the access point; and add up the attractive forces produced by the grids in the neighboring area that are not covered by any access point to the access point and the repulsive forces produced by the grids in the neighboring area that are covered by the access point and other access points in an overlapped manner to the access point, so as to obtain the virtual force of the access point.

Alternatively, the central processing unit 2501 may further be configured to calculate friction forces produced by the grids in the neighboring area that are covered by the access point only to the access point; calculate an adjustment coefficient of a movement step of the access point according to the friction forces; and calculate the movement position of the access point according to a position of the access point before it moves, the movement step of the access point, the adjustment coefficient and the virtual force of the access point.

Alternatively, the central processing unit 2501 may further be configured to determine a set of grids located at each boundary of the deployment area in the neighboring area; and determine whether the access point is able to proceed with moving towards each boundary according to a control function of each boundary and the set of the grids of each boundary.

In another implementation, the wireless network deployment apparatus described in Embodiment 2 and the central processing unit 2501 may be configured separately. For example, the wireless network deployment apparatus may be configured as a chip connected to the central processing unit 2501, with functions of the wireless network deployment apparatus being realized under control of the central processing unit 2501.

Furthermore, as shown in FIG. 25, the computer system 2500 may include an input device 2503, and an output device 2504, etc.; wherein, functions of the above parts are similar to those in the prior art, which shall not be described herein any further. It should be noted that the computer system 2500 does not necessarily include all the parts shown in FIG. 25; and furthermore, the computer system 2500 may include parts not shown in FIG. 25, and the prior art may be referred to.

With the computer system of this embodiment, a deployment process of the wireless network is simulated as a dynamic physical process, movement of the access points along a direction of a resultant force of all repulsion forces and attractive forces is controlled following the principle that an overlapping covered area produces a repulsion force to access points and an uncovered area produces an attraction force to the access points, thereby simplifying the deployment process of the wireless network, with the calculation of the process being simple, and being fast in convergence.

An embodiment of the present disclosure further provides a computer-readable program, wherein when the program is executed in a wireless network deployment apparatus, the program enables a computer to carry out the method as described in Embodiment 1 in the wireless network deployment apparatus.

According to a further aspect of the embodiments of the present disclosure, there is provided a storage medium in which a computer-readable program is stored, wherein the computer-readable program enables a computer to carry out the method as described in Embodiment 1 in a wireless network deployment apparatus.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

For the implementations of the present disclosure containing the above embodiments, following supplements are further disclosed.

Supplement 1. A wireless network deployment method, including:

initializing the wireless network to determine a deployment area of the wireless network and the number of access points needing to be deployed;

initializing positions of the access points, and dividing the deployment area into grids;

calculating a virtual force of each access point in the wireless network based on signal coverage of each grid;

calculating a movement position of each access point according to the virtual force of each access point;

performing edge controlling on each access point; and terminating processing in case that a terminating condition is satisfied, so as to obtain a deployment result of the wireless network;

Supplement 2. The method according to supplement 1, wherein the calculating a virtual force of each access point in the wireless network based on signal coverage of each grid includes:

calculating the signal coverage of each grid, so as to determine a set of access points covering each grid;

searching a neighboring area of each access point;

determining that a type of a grid in the neighboring area is being not covered by any access point, being covered by the access point only, being covered by other access points or being covered by the access point and other access points in an overlapped manner; and calculating the virtual force of the access point according to the types of the grids in the neighboring area.

Supplement 3. The method according to supplement 2, wherein the searching a neighboring area of each access point includes:

expanding a grid where the access point is located taking the grid where the access point is located as a center, so as to obtain an edge area, the grid where the access point is located being a searched area;

expanding the edge area, until grids in the edge area go beyond the deployment area or are covered by other access points only, so as to obtain an expanded area, the edge area becoming a searched area; and performing expansion taking the expanded area as a new edge area if the expanded area is not empty, otherwise, taking a current searched area as a neighboring area of the access point.

Supplement 4. The method according to supplement 2, wherein the calculating the virtual force of the access point according to the types of the grids in the neighboring area includes:

calculating attractive forces produced by the grids in the neighboring area that are not covered by any access point to the access point;

calculating repulsive forces produced by the grids in the neighboring area that are covered by the access point and other access points in an overlapped manner to the access point; and adding up the attractive forces produced by the grids in the neighboring area that are not covered by any access point to the access point and the repulsive forces produced by the grids in the neighboring area that are covered by the access point and other access points in an overlapped manner to the access point, so as to obtain the virtual force of the access point.

Supplement 5. The method according to supplement 4, wherein a formula for calculating the attractive forces is:

$$F_{i,j} = \frac{P_{i,j} - P_I}{\|P_{i,j} - P_I\|};$$

where, $C_{i,j}$ is the grid covered by no access point, $P_{i,j}$ is a position of the grid $C_{i,j}$, and $P_I$ is a position of the access point.

Supplement 6. The method according to supplement 4, wherein a formula for calculating the repulsive forces is:

$$F_{p,q} = \frac{P_I - P_c}{\|P_I - P_c\|};$$

where, $C_{p,q}$ is a grid covered by the access point and other access points in an overlapped manner, $P_C$ is a central position of all access points covering the grid $C_{p,q}$, and $P_I$ is a position of the access point.

Supplement 7. The method according to supplement 4, wherein a formula for calculating the virtual force is:

$$F_I = \sum_{C_{ij} \in B_I^0} w_{i,j} F_{i,j} + \sum_{C_{qp} \in B_I^2} w_{p,q} F_{p,q};$$

where, $w_{i,j}$ and $w_{p,q}$ are weighted values, $w_{i,j} \in [0,1]$, $w_{p,q} \in [0,1]$, $B_I^0$ is a set of grids in the neighboring area not covered by any access point, and $B_I^2$ is a set of grids in the neighboring area covered by the access point and the other access points in an overlapped manner.

Supplement 8. The method according to supplement 2, wherein the calculating a movement position of each access point according to the virtual force of each access point includes:

calculating friction forces produced by the grids in the neighboring area that are covered by the access point only to the access point;

calculating an adjustment coefficient of a movement step of the access point according to the friction forces; and calculating the movement position of the access point according to a position of the access point before it moves, the movement step of the access point, the adjustment coefficient and the virtual force of the access point.

Supplement 9. The method according to supplement 8, wherein a formula for calculating the friction forces is:

$$F_I^f = |B_I^1|;$$

where, $B_I^1$ is a set of grids in the neighboring area covered only by the access point, and $|B_I^1|$ is the number of the grids in the neighboring area covered only by the access point.

Supplement 10. The method according to supplement 8, wherein a formula for calculating the adjustment coefficient is:

$$k_I = 1 - F_I^f / F_{max}^f;$$

where, $F_{max}^f$ is a maximum value of the friction forces to which all the access points in the wireless network are subjected.

Supplement 11. The method according to supplement 8, wherein a formula for calculating the movement position is:

$$P'_I = P_I + k_I \Delta P \frac{F_I}{\|F_I\|};$$

where, $P'_I$ is a position of the access point after moving, $P_I$ is the position of the access point before moving, $\Delta P$ is the movement step of the access point, $F_I$ is the virtual force of the access point, and $k_I$ is the adjustment coefficient.

Supplement 12. The method according to supplement 2, wherein the performing edge controlling on each access point includes:

determining a set of grids located at each boundary of the deployment area in the neighboring area; and determining whether the access point is able to proceed with moving towards each boundary according to a control function of each boundary and the set of the grids of each boundary.

Supplement 13. A wireless network deployment apparatus, including:

a first initializing unit configured to initialize the wireless network to determine a deployment area of the wireless network and the number of access points needing to be deployed;

a second initializing unit configured to initialize positions of the access points, and divide the deployment area into grids;

a first calculating unit configured to calculate a virtual force of each access point in the wireless network based on signal coverage of each grid;

a second calculating unit configured to calculate a movement position of each access point according to the virtual force of each access point;

an edge controlling unit configured to perform edge controlling on each access point; and a judging unit configured to judge whether a terminating condition is satisfied, and terminate processing in case that the terminating condition is satisfied, so as to obtain a deployment result of the wireless network.

Supplement 14. The apparatus according to supplement 13, wherein the first calculating unit includes:

a first calculating module configured to calculate the signal coverage of each grid, so as to determine a set of access points covering each grid;

a searching module configured to search a neighboring area of each access point;

a first determining module configured to determine that a type of a grid in the neighboring area is being not covered by any access point, being covered by the access point only, being covered by other access points, or being covered by the access point and other access points in an overlapped manner; and a second calculating module configured to calculate virtual force of the access point according to the types of the grids in the neighboring area.

Supplement 15. The apparatus according to supplement 14, wherein the searching module includes:

a first expanding module configured to expand a grid where the access point is located taking the grid where the access point is located as a center, so as to obtain an edge area, the grid where the access point is located being a searched area;

a second expanding module configured to expand the edge area, until grids in the edge area go beyond the deployment area or are covered by other access points only, so as to obtain an expanded area, the edge area becoming a searched area; and a judging module configured to judge whether the expanded area is not empty, and perform expansion taking the expanded area as a new edge area if the expanded area is not empty, otherwise, take a current searched area as a neighboring area of the access point.

Supplement 16. The apparatus according to supplement 14, wherein the second calculating module includes:

a third calculating module configured to calculate attractive forces produced by the grids in the neighboring area that are not covered by any access point to the access point;

a fourth calculating module configured to calculate repulsive forces produced by the grids in the neighboring area that are covered by the access point and other access points in an overlapped manner to the access point; and a fifth calculating module configured to add up the attractive forces produced by the grids in the neighboring area that are not covered by any access point to the access point and the repulsive forces produced by the grids in the neighboring area that are covered by the access point and other access points in an overlapped manner to the access point, so as to obtain the virtual force of the access point.

Supplement 17. The apparatus according to supplement 14, wherein the second calculating module includes:

a sixth calculating module configured to calculate friction forces produced by the grids in the neighboring area that are covered by the access point only to the access point;

a seventh calculating module configured to calculate an adjustment coefficient of a movement step of the access point according to the friction forces; and an eighth calculating module configured to calculate the movement position of the access point according to a position of the access point before it moves, the movement step of the access point, the adjustment coefficient and the virtual force of the access point.

Supplement 18. The apparatus according to supplement 14, wherein the edge controlling unit includes:

a second determining module configured to determine a set of grids located at each boundary of the deployment area in the neighboring area; and a third determining module configured to determine whether the access point is able to proceed with moving towards each boundary according to a control function of each boundary and the set of the grids of each boundary.

Supplement 19. A computer system, including a wireless network deployment apparatus, the wireless network deployment apparatus being configured to:

initialize the wireless network to determine a deployment area of the wireless network and the number of access points needing to be deployed;

initialize positions of the access points, and divide the deployment area into grids;

calculate a virtual force of each access point in the wireless network based on signal coverage of each grid;

calculate a movement position of each access point according to the virtual force of each access point;

perform edge controlling on each access point; and terminate processing in case that a terminating condition is satisfied, so as to obtain a deployment result of the wireless network.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A wireless network deployment apparatus, which is included in a computer system, comprising:
   a memory that stores a plurality of instructions; and
   a processor coupled to the memory and configured to execute the instructions to:
   initialize a wireless network to determine a deployment area of the wireless network and a number of access points needing to be deployed;
   initialize positions of the access points, and divide the deployment area into grids;
   calculate a virtual force on each access point in the wireless network based on signal coverage of each grid;
   calculate a movement position of each access point according to the virtual force on each access point;
   perform edge control on each access point; and
   judge whether a terminating condition is satisfied, and terminate processing when the terminating condition is satisfied to obtain movement positions of the access points,
   wherein, a wireless network is deployed in accordance with the movement positions of the access points,
   wherein, the virtual force on each access point comprises attractive forces and repulsive forces produced by the grids in a neighboring area of each access point,
   wherein the processor is configured to execute the instructions to:
   calculate the signal coverage of each grid to determine a set of access points covering each grid;
   search a neighboring area of each access point;
   determine whether a type of a grid in the neighboring area is one of being not covered by any access point, being covered by the access point only, being covered by other access points, and being covered by the access point and other access points in an overlapped manner; and
   calculate the virtual force according to types of the grids in the neighboring area.

2. The apparatus according to claim 1, wherein the processor is configured to execute the instructions tot:
   expand a grid where the access point is located using the grid where the access point is located as a center to obtain an edge area, the grid where the access point is located being a searched area;
   expand the edge area, until grids in the edge area one of go beyond the deployment area and are covered by other access points only to obtain an expanded area, the edge area becoming the searched area; and
   judge whether the expanded area is not empty, and perform expansion taking the expanded area as a new edge area when the expanded area is not empty, otherwise, take a current searched area as the neighboring area of the access point.

3. The apparatus according to claim 1, wherein the processor is configured to execute the instructions to:
   calculate attractive forces produced by the grids in the neighboring area that are not covered by any access point to the access point;
   calculate repulsive forces produced by the grids in the neighboring area that are covered by the access point and other access points in an overlapped manner to the access point; and
   add up the attractive forces produced by the grids in the neighboring area that are not covered by any access point to the access point and the repulsive forces produced by the grids in the neighboring area that are covered by the access point and other access points in an overlapped manner to the access point to obtain the virtual force of the access point.

4. The apparatus according to claim 1, wherein the processor is configured to execute the instructions to:
calculate friction forces produced by the grids in the neighboring area that are covered by the access point only to the access point;
calculate an adjustment coefficient of a movement step of the access point according to the friction forces; and
calculate the movement position of the access point according to a position of the access point before the access point moves, the movement step of the access point, the adjustment coefficient and the virtual force of the access point.

5. The apparatus according to claim 1, wherein the processor is configured to execute the instructions to:
determine a set of grids located at each boundary of the deployment area in the neighboring area; and
determine whether the access point is able to proceed with moving towards each boundary according to a control function of each boundary and a set of the grids of each boundary.

6. A wireless network deployment method, executed by a wireless network deployment apparatus included in a computer system comprising a memory and a processor coupled to the memory, comprising:
initializing the wireless network to determine a deployment area of the wireless network and a number of access points needing to be deployed;
initializing positions of the access points, and dividing the deployment area into grids;
calculating a virtual force on each access point in the wireless network based on signal coverage of each grid;
calculating a movement position of each access point according to the virtual force of each access point;
performing edge control on each access point; and
terminating processing when a terminating condition is satisfied to obtain movement positions of the access points,
wherein, a wireless network is deployed in accordance with the movement positions of the access points,
wherein, the virtual force on each access point comprises attractive forces and repulsive forces produced by the grids in a neighboring area of each access point,
wherein the calculating a virtual force on each access point in the wireless network based on signal coverage of each grid comprises:
calculating the signal coverage of each grid to determine a set of access points covering each grid;
searching a neighboring area of each access point;
determining whether a type of a grid in the neighboring area is one of being not covered by any access point, being covered by the access point only, being covered by other access points and being covered by the access point and other access points in an overlapped manner; and
calculating the virtual force of the access point according to types of the grids in the neighboring area.

7. The method according to claim 6, wherein the searching a neighboring area of each access point comprises:
expanding a grid where the access point is located using the grid where the access point is located as a center to obtain an edge area, the grid where the access point is located being a searched area;
expanding the edge area, until grids in the edge area one of go beyond the deployment area and are covered by other access points only to obtain an expanded area, the edge area becoming the searched area; and
performing expansion taking the expanded area as a new edge area when the expanded area is not empty, otherwise, taking a current searched area as the neighboring area of the access point.

8. The method according to claim 6, wherein the calculating the virtual force of the access point according to the types of the grids in the neighboring area comprises:
calculating attractive forces produced by the grids in the neighboring area that are not covered by any access point to the access point;
calculating repulsive forces produced by the grids in the neighboring area that are covered by the access point and other access points in an overlapped manner to the access point; and
adding up the attractive forces produced by the grids in the neighboring area that are not covered by any access point to the access point and the repulsive forces produced by the grids in the neighboring area that are covered by the access point and other access points in an overlapped manner to the access point to obtain the virtual force of the access point.

9. The method according to claim 8, wherein a formula for calculating the attractive forces comprises:

$$F_{i,j} = \frac{P_{i,j} - P_I}{\|P_{i,j} - P_I\|};$$

where, $C_{i,j}$ is the grid covered by no access point, $P_{i,j}$ is a position of the grid $C_{i,j}$, and $P_I$ is a position of the access point.

10. The method according to claim 8, wherein a formula for calculating the repulsive forces comprises:

$$F_{p,q} = \frac{P_I - P_c}{\|P_I - P_c\|};$$

where, $C_{p,q}$ is a grid covered by the access point and other access points in an overlapped manner, $P_C$ is a central position of all access points covering the grid $C_{p,q}$, and $P_I$ is a position of the access point.

11. The method according to claim 8, wherein a formula for calculating the virtual force comprises:

$$F_I = \sum_{C_{ij} \in B_I^0} w_{i,j} F_{i,j} + \sum_{C_{qp} \in B_I^2} w_{p,q} F_{p,q};$$

where, $w_{i,j}$ and $w_{p,q}$ are weighted values, $w_{i,j} \in [0,1]$, $w_{p,q} \in [0,1]$, $B_I^0$ is a set of grids in the neighboring area not covered by any access point, and $B_I^2$ is a set of grids in the neighboring area covered by the access point and the other access points in an overlapped manner.

12. The method according to claim 6, wherein the calculating a movement position of each access point according to the virtual force of each access point comprises:
calculating friction forces produced by the grids in the neighboring area that are covered by the access point only to the access point;
calculating an adjustment coefficient of a movement step of the access point according to the friction forces; and calculating a movement position of the access point according to a position of the access point before the access point moves, the movement step of the access point, the adjustment coefficient and the virtual force of the access point.

13. The method according to claim 12, wherein a formula for calculating the friction forces comprises:

$$F_I^f = |B_I^1|;$$

where, $B_I^1$ is a set of grids in the neighboring area covered only by the access point, and is the number of the grids in the neighboring area covered only by the access point.

14. The method according to claim 12, wherein a formula for calculating the adjustment coefficient comprises:

$$k_I = 1 - F_I^f / F_{max}^f;$$

where, $F_{max}^f$ is a maximum value of the friction forces to which all the access points in the wireless network are subjected.

15. The method according to supplement 12, wherein a formula for calculating the movement position comprises:

$$P_I' = P_I + k_I \Delta P \frac{F_I}{\|F_I\|};$$

where, $P'_I$ is a position of the access point after moving, $P_I$ is the position of the access point before moving, $\Delta P$ is a movement step of the access point, $F_I$ is the virtual force of the access point, and $k_I$ is the adjustment coefficient.

16. The method according to claim 7, wherein the performing edge control on each access point includes:
determining a set of grids located at each boundary of the deployment area in the neighboring area; and
determining whether the access point is able to proceed with moving towards each boundary according to a control function of each boundary and the set of the grids of each boundary.

17. A computer system, including a wireless network deployment apparatus, the wireless network deployment apparatus comprising:
a memory that stores a plurality of instructions; and
a processor coupled to the memory and configured to execute the instructions to:
initialize a wireless network to determine a deployment area of the wireless network and a number of access points needing to be deployed;
initialize positions of the access points, and divide the deployment area into grids;
calculate a virtual force on each access point in the wireless network based on signal coverage of each grid;
calculate a movement position of each access point according to the virtual force of each access point;
perform edge control on each access point; and
terminate processing when a terminating condition is satisfied to obtain movement positions of the access points,
wherein, a wireless network is deployed in accordance with the movement positions of the access points,
wherein, the virtual force on each access point comprises attractive forces and repulsive forces produced by the grids in a neighboring area of each access point,
wherein the processor is configured to execute the instructions to:
calculate the signal coverage of each grid to determine a set of access points covering each grid;
search a neighboring area of each access point;
determine whether a type of a grid in the neighboring area is one of being not covered by any access point, being covered by the access point only, being covered by other access points, and being covered by the access point and other access points in an overlapped manner; and
calculate the virtual force according to types of the grids in the neighboring area.

* * * * *